May 21, 1946.  H. S. WHELLER  2,400,617
HEATING MEANS
Filed April 17, 1943
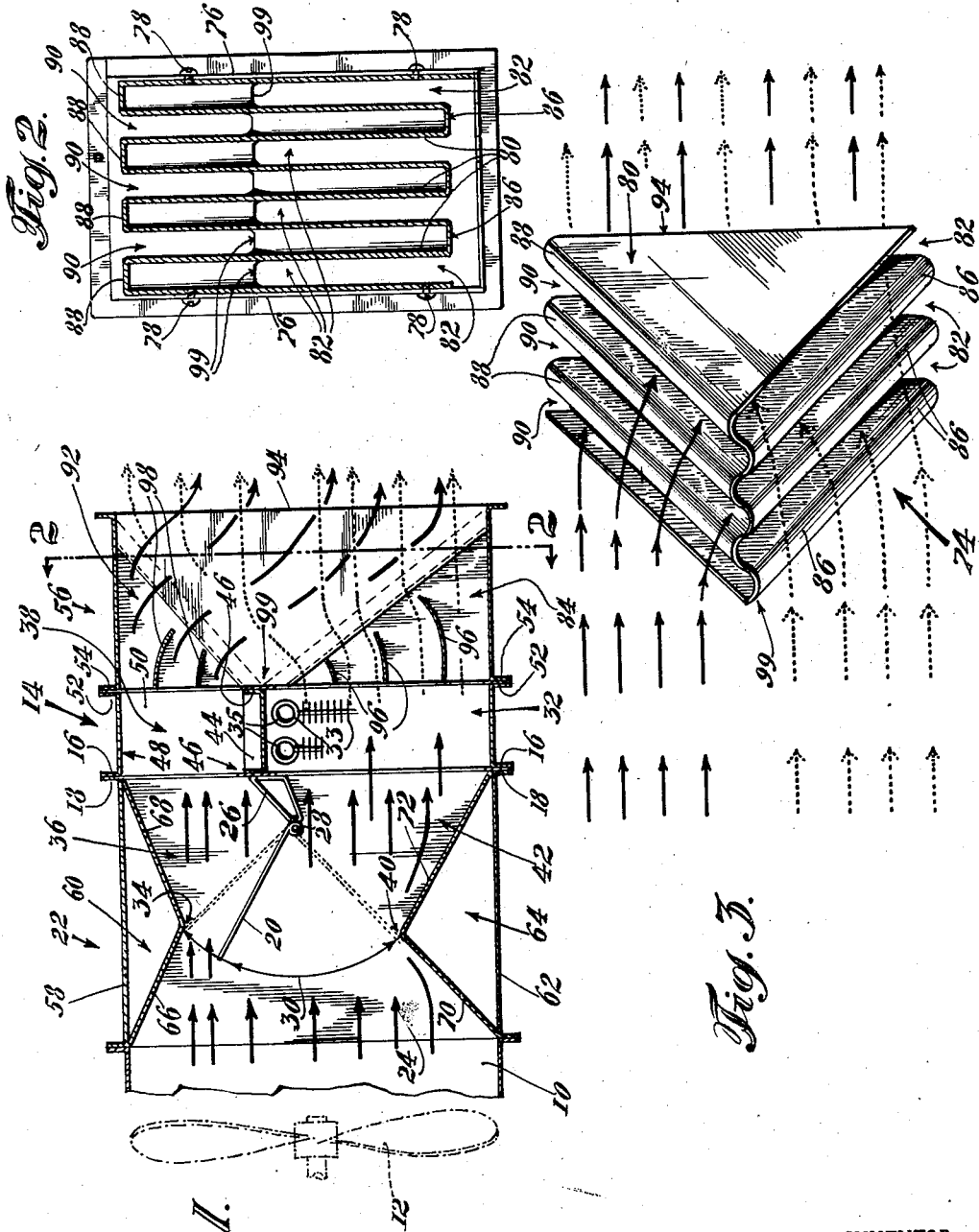
INVENTOR.
Harry Stewart Wheller
BY Orving F. Goodfriend Patented May 21, 1946

2,400,617

UNITED STATES PATENT OFFICE 2,400,617

HEATING MEANS

Harry Stewart Wheller, Elizabeth, N. J., assignor to L. J. Wing Mfg. Co., New York, N. Y., a corporation of New York Application April 17, 1943, Serial No. 483,526

9 Claims. (Cl. 98—38)

This invention relates to a mixing chamber by means of which two separate streams, each of characteristics differing from the other, are each broken up into relatively thin parts, which parts are intimately mixed together and discharged from the chamber as one stream, of which they constitute thin components, so arranged relative to one another that components having the characteristics of one stream are separated by a component having the characteristics of the other stream.

In one form of the present invention, it relates more particularly to the use of such a mixing chamber in a heating system in which the temperature of the air discharged therefrom is regulated or controlled by mixing a selected volume of unheated air with a selected volume of air heated in the system, the temperature of the resulting discharged air then being that somewhere between the temperatures of the heated and unheated air, depending on the proportionate volumes of each which have been mixed together.

Systems of this kind have generally employed a means for heating a stream of air circulated through it and a means for bypassing air around the heating means on the outside thereof.

Dampers are also employed to regulate the volume of air circulated through the heating means and through the bypass means.

The bypassed stream of unheated air is then introduced alongside of or parallel to the heated stream of air issuing from the heating means in order, by mixing the two streams together, to produce one stream of uniform temperature.

Such systems of the prior art have been comparatively ineffective and unsatisfactory to regulate the temperature of the air discharged from the system because heretofore there was provided for this purpose no effective means for adequately mixing the relatively large streams of heated and unheated air.

Where, as in the prior art, relatively large streams of heated and unheated air are discharged into an open space, they do not thoroughly mix together but tend to continue in a condition of separate streams.

Or, where the heated and unheated streams of air are there confined in a duct, they also do not thoroughly mix together until they have traveled together in the duct a relatively long distance, which distance of travel, for practical reasons, cannot always be provided in actual practice.

In any event, therefore, the temperature of the air stream discharged from the heating systems of the prior art is consequently not uniform throughout.

Such lack of uniformity, where the air is discharged into a room that is occupied by persons, causes discomfort to them, since, if they are in the path of the heated air, they will be too warm and if in the path of the unheated air, they will be too cool.

Similarly, where the air discharged from the heating system is used for certain industrial processes, a non-uniform temperature of the air may produce unsatisfactory results in the practice of the processes.

The present invention, which has now been successfully used, therefore contemplates the provision of an air mixing chamber which may be combined or associated with a heating system or device of this kind so that each column of heated and unheated air, introduced into the chamber, is broken up into thin streams which flow from the chamber in the same general direction to constitute immediately adjacent, alternately arranged, heated and unheated components or layers of the stream of air discharged from the system and which components or layers completely and thoroughly mix together within a comparatively short length of travel from the chamber to provide the uniform temperature sought.

Other and further objects and advantages of the present invention will be clear from the description which follows and the drawing in which Fig. 1 is a horizontal sectional view through a heating device, according to my invention.

Fig. 2 is a sectional view on the line 2—2 of Fig. 1.

Fig. 3 is a perspective view of the baffle means for dividing the heated and unheated streams of air into thin alternate adjacent columns or layers thereof.

Throughout the figures of the drawing, the direction of flow of unheated streams of air is indicated by full lines and arrows and the direction of flow of heated streams of air is indicated by broken lines and arrows.

In that practical embodiment of my invention which I have illustrated by way of example in Figs. 1 to 3, air is circulated through the heating system with which the mixing chamber is associated as by a fan 12, which is schematically shown in a duct 10, leading from a source of air.

The construction of the fan, its relative position in the system or its driving means need not be illustrated in detail, since they are well known in the art and may vary as selected.

The heater carrying part 14, which is preferably a separate unit, is secured by means of the flanges 16 and 18 to the damper 20 carrying part 22, which likewise is preferably a separate unit.

In the description and drawing, details of construction of the different parts, the duct and other parts of the heating system are only schematically illustrated and described as that will be sufficient for an understanding of the invention, since all these elements are conventional and well known to those skilled in the art.

I secure to the top and bottom walls 24 of the damper carrying section or part 22, as by means of screws or rivets, the support 26, on which the pivot 28 is carried so that the damper 20, on which it is carried, may be swung into any selected position through the arc indicated by the arrows 30.

Air circulated through the system is heated by any suitable means, such as the heater 32 mounted in the part 14 and which heater may be exemplified by the "Wing Featherfin Heater Section," manufactured by L. J. Wing Mfg. Co., New York, N. Y.

In this type of heater steam is used as the heating medium which is circulated through the finned heating tubes 33 (shown in part) secured to the steam and return headers 35, which connect to the steam system.

To circulate all the air through the heater 32, so that heated air at the maximum temperature will be discharged from the system, the damper 20 is swung into position against the damper seat 34 (as indicated by the broken lines) to completely shut off circulation of air through the passageway 36, in the damper part 22 and which passageway leads to the heater bypass 38 in the part 14.

To bypass air completely around the heater 32 on the outside thereof, so that only unheated air will be discharged from the system, the damper 20 is swung into position on the pivot 28 against the other seat 40 (as indicated by the broken lines) to close off the air passageway 42 to the heater.

In this position of the damper, air is circulated only through the passageway 36 and the bypass 38, formed in the heater part 14 by the plate 44 secured in any suitable airtight manner to the frame 46 of the heater casing 32 and the side 48 and top 50 of the part 14.

In order to regulate the relative volume of air circulated through and bypassing the heater so that the columns of heated and unheated air may be coordinately controlled in selected proportion, the damper 20 is swung into the necessary selected position intermediate the seats 34 and 40.

Any suitable damper arrangement may be used, that just described being for purposes of illustration only.

The heated and unheated air streams thus discharged from the heater part 14 are mixed together before the air is discharged from the system, the temperature of the discharged air being the average temperature resulting from the mixture of the heated and unheated air.

As pointed out, the construction of prior art devices did not produce thorough and complete mixing of the heated and unheated components.

At best, they produced a comparatively small number of relatively large streams of heated and unheated air.

My invention, on the other hand, does produce thorough and complete mixing of the different air streams by breaking up each of them into relatively thin components or streams so intimately intermingled with one another that they quickly mix together within the limitations of space imposed in practice.

I accomplish this by means of my novel air stratifying and strata mixing chamber 56, which likewise may be a separate unit secured to the heater carrying section 14 by means of the connected flanges 52 and 54.

In order to direct the air into the heater 32 and the bypass 38 or either of them, the throat, in which the damper 20 operates, may be formed by the baffle 60 at one side 58 of the damper carrying part 22 and the baffle 64 at the other side 62 of the part 22.

That part where the inclined front wall 66 and rear wall 68 of the baffle 60 join constitutes one seat 34 for the damper 20 and that part where the inclined front wall 70 and rear wall 72 of the other baffle join constitutes the other seat 40 for the damper.

I arrange in the air stratifying and strata mixing chamber 56, means for breaking up each stream of heated and unheated air, intermingling the thus formed parts thereof to discharge them in the same general direction of flow from the chamber as one stream the components of which alternately heated and unheated across the stream, they constitute, which means comprises the baffle element 74, which may be secured to the top and bottom 76 of the chamber 56, as by the screws 78.

The element 74 comprises the spaced preferably triangular shaped plates 80, the apices of which are arranged in an air tight manner along an edge of the heater 32.

To form spaced relatively narrow passages 82 for the heater air, which passages are open only to the heated air inlet compartment 84, communicating with the heater 32, I alternately join together pairs of adjacent plates 80 along one side of the triangles formed thereby by means of the cut-off walls 86.

To separate each heated air passage 82 from the next adjacent heated air passage by a relatively narrow passage 90 for unheated air and which passages 90 are open only to the unheated air inlet compartment 92, communicating with the by-pass 38, I alternately join together pairs of adjacent plates 80 along the other side of the triangles by means of the cut-off walls 88.

The bases 94 of the triangular plates 80 are unconnected to form adjacent side by side outlets to the heated and unheated air passages so that air is discharged from the mixing chamber as one stream comprising thin components of heated air separated by a thin component of unheated air, all flowing in the same general direction.

Because these components are relatively thin they quickly merge into one another to form a stream which in a short space is practically uniform in temperature throughout.

The rapid mixing together of the heated and unheated components is greatly accelerated by the turbulent state of the air as it leaves the baffle element, a relatively high degree of turbulence being caused by the passage of air between the closely adjacent plates or walls in the mixing chamber.

In order to distribute the heated air throughout the passages 82 and to insure its uniform flow across the area of the outlet thereto, I secure in the compartment 84, along the top and bottom 76 of the chamber 56, spaced air deflecting vanes 96, in the illustration three in number, which are curved toward the walls 88 so that the heated air entering these passages will be swept toward the closed sides of the passages and therefore completely fill them from top to bottom.

For the same purpose, I secure in the compartment 92, along the sides of the mixing chamber, spaced air deflecting vanes 98, which in the illustration need only be two in number because the walls 88 are shorter than the walls 86, and which vanes are curved toward the walls 86 so that the unheated air is swept toward the closed sides of the passages 92 to fill them from top to bottom.

The plates 80 are spaced such distance apart as will break up the streams into compartments thin enough for the purpose desired and which to some extent will depend on the size of the heater section used.

In practice I have found a distance of two to four inches between the plates provides excellent results, using a space of two inches for a heater two feet square and four inches for a heater four feet square.

It will now be recognized that in the practice of my invention, communication between the heated air inlet compartment 84 and the unheated air inlet compartment 92 is shut off so that air from one does not leak into the other before the streams are broken up and intermingled as described.

To accomplish this, the baffle element 74 may be secured to the heater casing in any suitable manner, as welding or soldering, to provide an air tight joint along the apices 99, where they rest against the heater section 32 (see Fig. 1) so that communication between the compartments 84 and 92 is shut off.

While baffle plates or walls 80 of other shapes may be used in the practice of my invention, I have found that those of triangular shape are most advantageous.

Such triangular shape permits the baffle plates to be constructed from a minimum quantity of material.

Further this triangular shape results in a more compact construction because the baffle element may be placed directly against the heater part in contact therewith, whereas with other shapes an open space between the heater part and the baffle element must be allowed.

In addition this triangular shape reduces the resistance to air flow in the mixing chamber by providing a greater aperture area for a given air flow than is provided by other shapes of baffle plates or walls and further leaves space available wherein relatively inexpensive deflecting vanes, such as those illustrated in Fig. 1, may be arranged.

With other shaped plates or walls, the overall length of the mixing chamber must be increased in order to accommodate such inexpensive deflecting vanes or in the alternative separate vanes must be installed in each thin passage, which is a difficult and expensive method of construction.

While in the foregoing description, my invention has been illustrated as applied to a heating system, it will be understood that it may be used with equal advantage in connection with cooling systems.

When applied to a cooling system, the operation of the air stratifying and strata mixing chamber is practically the same as heretofore described except that a cooling element is employed instead of the heating element and a cooled stream of air is mixed together with an uncooled stream of air.

It will now be apparent that I have provided a means for mixing together separate streams, each of different characteristics, which are intimately intermingled to rapidly constitute a single stream that is throughout uniform in characteristic.

While I have shown and described a certain specific example of my invention, it will be understood that such example is illustrative only and is not given as limitation, since other modifications within the spirit and scope of the invention will be apparent to those skilled in the art.

Hence, I do not intend to limit myself thereto, but intend to claim my invention as broadly as may be permitted by the state of the prior art and the terms of the appended claims.

I claim:

1. In a heating system; an air duct for unheated air; a heater in the air duct; said air duct having two passages, one for circulating air through the heater and the other for by-passing air outside and around the heater; a damper in the duct swingable into a selected position between the passages and adapted to shut off one or the other passage; an air stream stratifying chamber in the duct positioned to receive heated air from the heater and unheated air bypassing the heater; a baffle arranged in the air stream stratifying chamber, said baffle comprising a plurality of spaced triangular plates forming air paths therebetween, spaced walls joining pairs of adjacent plates and extending along one side of the plates from the apices thereof to one of the ends of the bases thereof and second mentioned spaced walls extending along other sides of the plates from the apices thereof to the other ends of the bases thereof and joining pairs of adjacent plates, said second mentioned walls spaced intermediate the first mentioned walls; said baffle arranged in the air stream stratifying chamber with apex extending along the inner side edge of the heater and the plates extending therefrom perpendicular to the heater with the base of the plates in the chamber outlet to form an inlet compartment to the air paths between the first mentioned walls for the air circulated through the heater and a second inlet compartment to the air paths between the second mentioned walls for the air bypassed around the heater.

2. In a heating system; an air duct, a heater therein, a damper for controlling the relative proportionate circulation of air through or by-passed around the heater, an air stratifying chamber in the duct; said heater intermediate the damper and the mixing chamber; and a three sided air stratifying means comprising a plurality of spaced plates arranged in the chamber, walls joining pairs of plates along one side of the stratifying means to block off access thereat from the heater to alternate spaces between the plates and second mentioned walls, spaced intermediate the first mentioned walls and joining pairs of plates along another side of the stratifying means to block off access thereat of air bypassed around the heater to the remaining alternate spaces, all the spaces being open along the third side of the stratifying means, the apex of said stratifying means positioned in the chamber along the inner edge of the heater adjacent the heater by-pass.

3. In an air stratifying chamber, for arrangement in a system in which two separate streams of air are circulated, a plurality of spaced triangular plates forming separated air paths therebetween and arranged within the chamber with the apices of the plates at the entrance to the chamber and spaced inwardly from the sides of the chamber and the bases of the plates at the exit to the chamber, spaced walls at one of the sides of the plates joining adjacent pairs of plates to close access at the entrance to the chamber to alternate air paths by one of the streams of air, and second mentioned walls at the other sides of the plates joining adjacent pairs of plates to close access at the entrance to the chamber to the remaining air paths by the other stream of air, all said air paths being open at the chamber exit.

4. In a ventilating system, an air duct, a heat exchange unit mounted in the duct and extending between two opposite walls and spaced from one of the other two opposite walls of said duct, means for dividing the air flow through said duct into two streams, one of which streams passes through said unit and the other of which streams by-passes around said unit, an air stratifying chamber, spaced triangular plates in the chamber forming a plurality of adjacent air paths, the apices of said plates located in the inlet of said chamber along the edge of the heat exchange unit spaced from said wall and with the bases of said plates at the exit of the chamber, spaced walls at one of the sides of the plates joining adjacent pairs of plates to close access to alternate air paths between the plates by the air stream passed through said heat exchange unit, and second connecting walls at the other sides of the plates joining adjacent pairs of plates to close access to remaining air paths between the plates by the air stream by-passed around said unit, all said air paths being open at the chamber exit.

5. In a heating system, an air duct, a heater mounted in the duct and extending between two opposite walls and spaced from one of the other two opposite walls of said duct, means for dividing the air flow through said duct into two streams, one of which streams passes through said heater and the other of which streams by-passes around said heater, said dividing means selectively fixing the relative proportions of one of said streams to the other of said streams, an air stratifying chamber, spaced triangular plates in the chamber forming a plurality of adjacent air paths, the apices of said plates located in the inlet of said chamber along the edge of the heater, spaced walls joining adjacent plates at one of the sides thereof to close access to alternate air paths by one of the said air streams, and second connecting walls joining adjacent pairs of plates at the other sides thereof to close access to the remaining air paths by the other of said air streams, all said air paths being open at the chamber exit.

6. In an air stratifying chamber for arrangement in the duct of a ventilating system having a heater mounted therein with an edge thereof intermediate two opposite walls of the duct, said ventilating system having means for dividing the air flow through the system into two streams one of which passes through the heater and the other of which by-passes around said heater, a plurality of spaced triangular plates forming separated air paths therebetween and arranged within the chamber with the apices of the plates at the entrance to the chamber intermediate the top and bottom walls of the chamber for mounting the apices along the said edge of the heater in the ventilating system, the bases of the plates at the exit to the chamber, spaced walls at one of the sides of the plates joining adjacent pairs of plates to close access to alternate air paths by one of the streams of air in the duct and second mentioned walls at the other sides of the plates joining adjacent pairs of plates to close access to the remaining air paths by the other stream of air, all of said air paths being open at the chamber exit, said first mentioned walls constituting with the chamber an inlet compartment to the first mentioned alternate air paths and said second menioned walls constituting with the chamber a second mentioned inlet compartment to the remaining air paths.

7. In an air stratifying chamber for arrangement in the duct of a ventilating system having a heater mounted therein with an edge thereof intermediate two opposite walls of the duct and said system having means for dividing the air flow through the system into two streams one of which passes through the heater and the other of which by-passes around the said heater, a plurality of spaced triangular plates forming separated air paths therebetween and arranged within the chamber with the apices of the plates at the entrance to the chamber intermediate two opposite walls of the chamber for mounting the apices along the said edge of the heater the bases of the plates at the exit to the chamber, spaced walls at one of the sides of the plates joining adjacent pairs of plates to close access to alternate air paths by one of the streams of air in the duct, second mentioned walls at the other side of the plates joining adjacent pairs of plates to close access to the remaining air paths by the other stream of air in the duct, said first mentioned sides constituting with the chamber an inlet compartment to the first mentioned alternate air paths and said second mentioned sides constituting with the chamber a second mentioned compartment to the remaining air paths and spaced air vanes in each compartment.

8. In an air stratifying chamber for arrangement in the duct of a ventilating system having a heater and in which the heater is mounted with the edge thereof intermediate two opposite walls of the duct, said system having means for dividing the air flow through the system into two streams one of which passes through the heater and the other of which by-passes around said heater, a plurality of spaced triangular plates forming separated air paths therebetween and arranged within the chamber with the apices of the plates at the entrance to the chamber for mounting the apices along the said edge of the heater and with the bases of the plates at the exit to the chamber, spaced walls at one of the sides of the plates joining adjacent pairs of plates to close access to alternate air paths by one of the air streams in the duct, second mentioned walls at the other side of the plates joining adjacent pairs of plates to close access to the remaining air paths by the other air stream, all said air paths being open at the chamber exit, said first mentioned sides constituting with the chamber an inlet compartment to the first mentioned alternate air paths and said second mentioned sides constituting with the chamber a second inlet compartment to the remaining air paths and spaced air vanes in one of the compartments curved toward the walls thereat.

9. The ventilating system of claim 4 and including a compartment adjacent the first mentioned walls and a second compartment adjacent the second mentioned walls, communication between the said compartments being shut off.

HARRY STEWART WHELLER.